United States Patent [19]

Lavin

[11] Patent Number: 4,816,695

[45] Date of Patent: Mar. 28, 1989

[54] OPTICAL FLUID DETECTOR

[76] Inventor: Thomas N. Lavin, 167 Filbert St., Sausalito, Calif. 94965

[21] Appl. No.: 91,389

[22] Filed: Aug. 31, 1987

[51] Int. Cl.$^4$ .............................................. G01H 15/06
[52] U.S. Cl. ...................................... 250/573; 356/436
[58] Field of Search ....................... 250/573, 577, 576; 356/436, 440; 340/603

[56] References Cited

U.S. PATENT DOCUMENTS

| | | | |
|---|---|---|---|
| 3,812,482 | 5/1974 | Clark | 250/573 |
| 3,861,802 | 1/1975 | Belmear, Jr. | 250/573 |
| 4,038,982 | 8/1977 | Burke et al. | 250/573 |
| 4,654,535 | 3/1987 | Wolske | 250/577 |

*Primary Examiner*—Edward P. Westin
*Assistant Examiner*—Khaled Shami
*Attorney, Agent, or Firm*—Flehr, Hohbach, Test, Albritton & Herbert

[57] ABSTRACT

An optical fluid detector (10) has an opaque housing (12). There is a first passage (14) through the housing (12) to receive a transparent, flexible plastic tube (50). A second passage (20) through the housing (12) orthogonally intersects the first passage (14). A first receptacle (22) in the housing has a light emitting diode (D1) with a housing having a flat surface (30) engaging the receptacle (22) and facing the second passage (20). A second receptacle (24) at a second end of the second passage on an opposing side of the first passage (14) from the first receptacle has a photodetector (Q1) with a housing having a flat surface (32) facing the second passage (20). An output circuit (33) is connected to the photodetector.

8 Claims, 3 Drawing Sheets

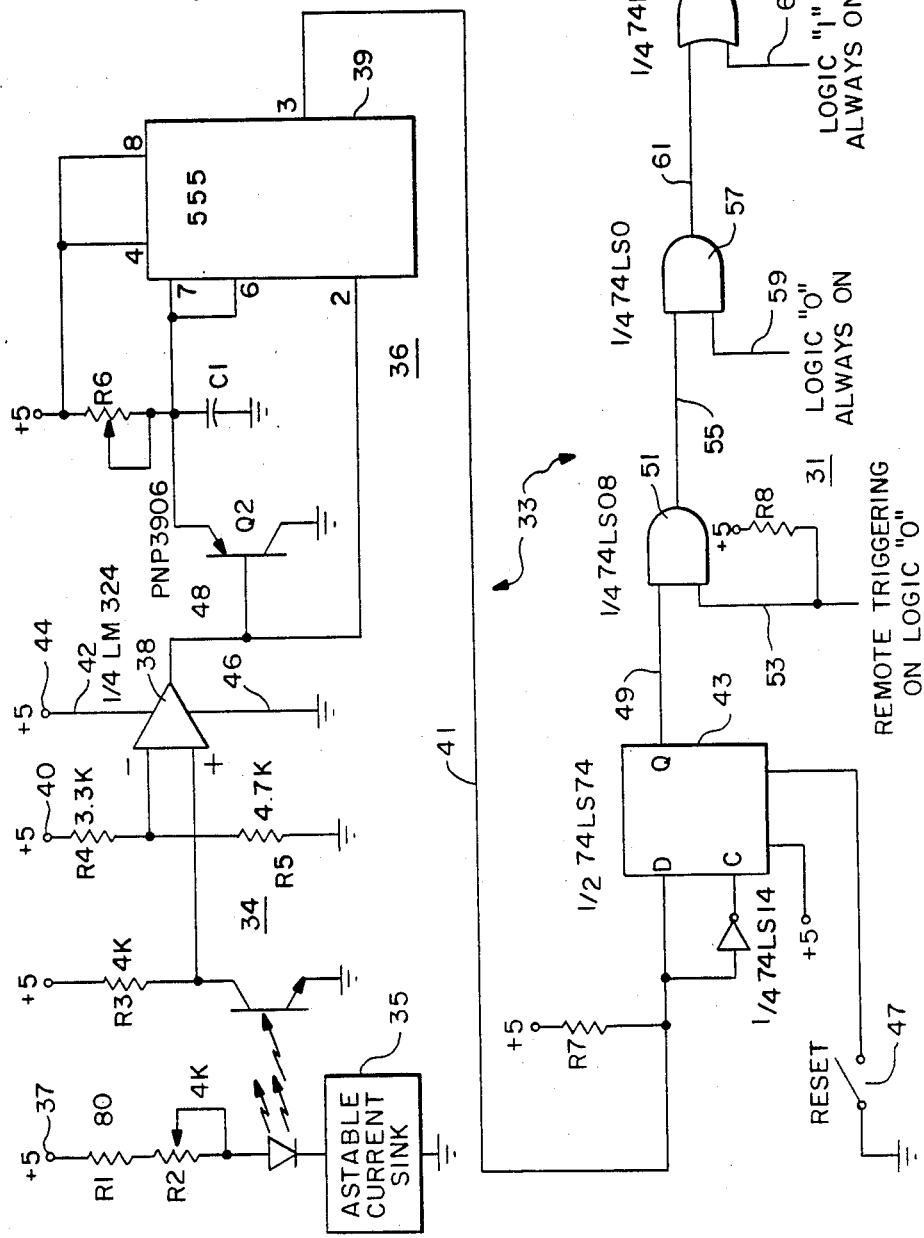

OPTICAL FLUID DETECTOR

BACKGROUND OF THE INVENTION

1. Field of the Invention

This application relates to a novel detector for sensing the presence of a fluid, especially a liquid, in a tube or similar restricted vessel which has a wall that will transmit light. More particularly, it relates to such a detector which employs an improved package for a light source and detector and simplified sensing electronics.

2. Description of the Prior Art

A variety of optical sensors for liquids are known in the art. For example, such optical sensors are shown in the following issued U.S. Pat. Nos. 3,209,596, issued Oct. 5, 1965 to Kelly; 3,459,303, issued Aug. 5, 1969 to Brenchley; 3,516,284, issued June 23, 1970 to Lockard; 3,697,185, issued Oct. 10, 1972 to Kassel et al.; 3,787,703, issued Jan. 22, 1974 to Topol; 3,908,129, issued Sept. 23, 1975 to Akers; 4,150,299, issued Apr. 17, 1979 to Kasiewicz et al.; 4,227,814, issued Oct. 14, 1980 to Soodak et al.; 4,244,364, issued Jan. 13, 1981 to Grushkin; 4,303,336, issued Dec. 1, 1981 to Cullis; 4,418,576, issued Dec. 6, 1983 to White; 4,576,477, issued Mar. 18, 1986 to Corbet et al. The state of the art of such optical sensors is further shown by West German Patent No. 3,034,874, issued Mar. 10, 1985 to Eckli and in Byte Magazine, January 1986, page 276.

A problem with respect to the sensor in the Byte article in particular is that discrete resistors in the detector circuit must have their value selected for each LED light source and phototransistor pair used in such a sensor. As a result, the detector there is not amenable to mass production. The Byte article further does not discuss orienting the light source and photodetector in the light path. The lack of detail in this respect provides insufficient information for building the device mentioned there. These prior art sensors typically require custom fabrication of at least one precision component in their optical paths. A further problem with the above prior art sensors in general is that the complexity of their detector circuits does not allow them to be made as small as would be desirable for many applications.

SUMMARY OF THE INVENTION

Accordingly, it is an object of this invention to provide an optical fluid detector having a light source and photodetector package and a detector circuit which is low in cost to fabricate and which is stable in operation over a wide temperature range.

It is a further object of the invention to provide such an optical fluid detector which allows both the light source and photodetector and the sensing circuit on a printed circuit board to be provided in a small package.

It is still another object of the invention to provide such an optical fluid detector which is usable for noninvasive sensing of the presence or absence of a fluid in a flexible transparent or semitransparent plastic tube.

It is yet another object of the invention to provide such an optical fluid detector which includes a circuit which is compatible with a wide variety of electronic controls.

It is still another object of the invention to provide such an optical fluid detector having a physical configuration which maximizes the amount of change in light seen between the presence and absence of fluid.

It is a further object of the invention to provide such an optical fluid detector having a physical configuration which will allow the detector to be used for detecting the presence or absence of either a clear liquid or an opaque liquid.

The attainment of these and related objects may be achieved with the novel optical fluid detector herein disclosed. An optical fluid detector in accordance with this invention includes an opaque housing. There is a first passage through the housing dimensioned and configured to receive a semitransparent or transparent, flexible plastic tube. A second passage through said housing orthogonally intersects the first passage. A first receptacle in the housing at a first end of the second passage has a light emitting diode in a housing with a flat surface facing the second passage. A second receptacle at a second end of the second passage on an opposing side of the first passage from the first receptacle has a photodetector with a housing having a flat surface facing the second passage. An output circuit is connected to the photodetector. The flat surfaces on the housings of the light emitting diode and photodetector housings allows the light emitting diode and the photodetector to be oriented precisely with respect to the light path through the second passage in the optical fluid detector.

The attainment of the foregoing and related objects, advantages and features of the invention should be more readily apparent to those skilled in the art, after review of the following detailed description of the invention, taken together with the drawings, in which:

BRIEF DESCRIPTION OF THE DRAWINGS

FIG. 3 is a schematic diagram of a detector circuit used in the optical fluid detector of FIGS. 1 and 2.

DETAILED DESCRIPTION OF THE INVENTION

Figure 1:
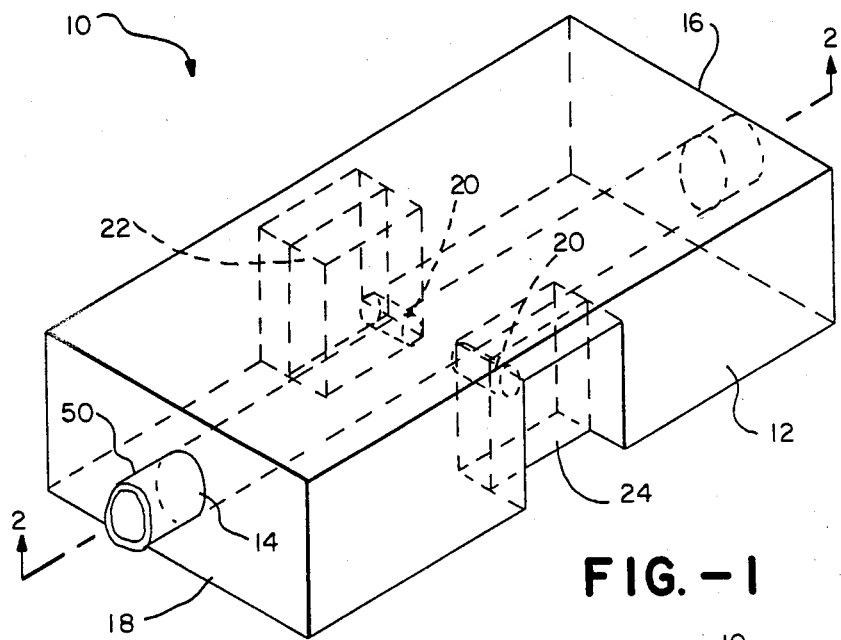
FIG. 1 is a perspective view of an optical fluid detector in accordance with the invention.

Before turning to a description of the detector shown in the drawings, certain background information on the optics of detecting a liquid in a small tube is useful for a more complete understanding of the invention. The optics are dependent on tube size, tube wall material and the fluid optical absorption. They are further dependent on the path length through which light is sent, i.e., the distance between the light source and the light detecting element. The optics are sensitive to the alignment of the light source and detecting element through their optical centers and to differing optical centers in the light source and detecting element as fabricated. If a light path in the detector is collimated, the collimation serves to magnify an optical change.

Figure 2:
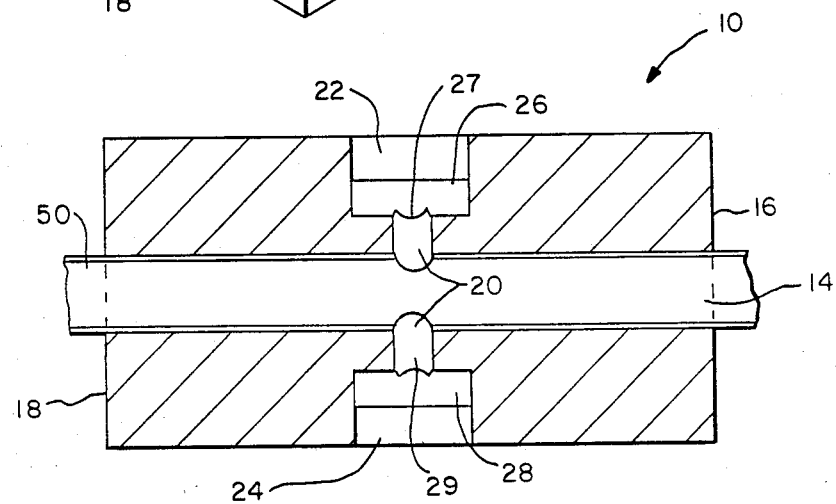
FIG. 2 is a cross-section view, taken along the line 2—2 in FIG. 1.

Turning now to the drawings, more particularly to FIGS. 1 and 2, there is shown an optical fluid detector 10 in accordance with the invention. The optical fluid detector 10 includes an opaque plastic housing 12, which may be fabricated from virtually any plastic material, for example, a black nylon or acrylic plastic.

The plastic chosen must be compatible with a cyanoacrylate glue or other suitable adhesive used to mount circuit components in the housing 12. The housing 12 has a laterally centered passage 14 extending from top 16 to bottom 18 of the housing. A second, laterally extending passage 20 orthogonally intersects the passage 14. The passage 20 is connected at each end to rectangular receptacles 22 and 24 for a light emitting diode (LED) 26 and a matched phototransistor 28, which are adhesively mounted with cyanoacrylate glue in the receptacles 22 and 24. The LED 26 and phototransistor 28 have facing flat surfaces 30 and 32, which fit against the receptacles 22 and 24 to orient the LED 26 and phototransistor 28 precisely in an optical path in the housing 12. Such a precise orientation of the LED 26 and the phototransistor 28 gives a high level of consistency with the matched LED and phototransistor pairs, which is a substantial factor in eliminating the need to adjust resistor values in detector circuit 34, described below in connection with FIG. 3. The LED 26 and the phototransistor 28 have curved lenses 27 and 29 facing outward from the flat surfaces 30 and 32 through which light from the LED 26 is emitted and through which the light enters the phototransistor 28. Such matched LED and phototransistor pairs are commercially available, for example, from General Electric, under the designation GE H23B1.

FIG. 3 shows output circuits 33 for the detector 10. The output circuits 33 consist of a detector circuit 34, a delay circuit 36 and a logic circuit 31. The detector circuit supplies a low output to the delay circuit 36 when liquid is present between the LED 26 and the phototransistor 28. The sensor delay circuit 36 provides a time delay on a liquid to no liquid transition between the LED 26 and the phototransistor 28. This time delay stabilizes the output and allows for dirt or small bubbles to pass between the LED 26 and the phototransistor 28 without tripping the detector 10. The logic circuit 38 provides an output logic 0 at a liquid to no liquid transition, after the delay established by the delay circuit 36.

In the detector circuit 34, +5 volt source 37 is connected through resistor R1 and variable resistor R2 to the anode of LED D1. Although 80 percent of the detectors 10 fabricated do not require a variable resistor in order to operate, the variable resistor R2 is provided to allow field adjustment, such as to compensate for aging of plastic tube 50 through which the liquid flows or the LED 26 and to allow the use of different size tubes 50. The cathode of the LED D1 is connected via an astable multivibrator 35 to ground. The collector of phototransistor Q1 is connected to resistor R3. The collector of the phototransistor Q1 is connected to the positive terminal of operational amplifier 38. A +5 volt source 40 is connected through resistor R4 to the negative terminal of the operational amplifier 38 and to ground through resistor R5. Terminal 42 of the operational amplifier 38 is connected to a +5 volt source 44, and terminal 46 is grounded. The output at terminal 48 can be either +5 volt with fluid absent or the reverse. As shown, the output at terminal 48 is low with liquid present.

In practice, the operational amplifier/comparator 38 is implemented with an LM 324 integrated circuit or a CMOS equivalent, available from National Semiconductor Corporation, Santa Clara, Calif. The detector circuit 34 allows a distance of from about 0.1 inch to about ⅜ inch between the LED D1 and the phototransistor Q1. The circuit 34 therefore accommodates a transparent, flexible plastic tube 50 (FIGS. 1 and 2) passed through the passage 14, and in which the presence or absence of liquid is to be detected.

The sensor drive circuit 35 is an astable multivibrator with a 10 to 20 percent duty cycle, which pulses the sensor IR transistor Q1 at a frequency, typically 10–100 Hz, providing a pulsed output to the LM324 circuit 38, and thus to Q2. This pulsed drive decreases current use and aging of the IRLED D1. If the astable sensor drive circuit 35 is omitted, the circuit 33 is fully functional, but will not have the above features. The sensor drive circuit 35 can be implemented with an NE 555 type circuit connected as an astable multivibrator.

The sensor delay circuit 36 is a negative recovery monostable multivibrator, implemented with an NE 555 timing circuit 39. The time delay is precisely controlled by resistor R6 and capacitor C1. Output 41 remains high until the signal from the detector circuit 34 stays high longer than the time delay established by the resistor R6 and the capacitor C1. Further details on such negative recovery monostable multivibrators are available in Lancaster, *The TTL Cookbook*, H. Sams & Co., pages 185–188.

Logic circuit 31 is implemented with a 74LS74 flip-flop circuit 43. Output 41 from the sensor delay circuit 36 is supplied as a D input to the flip-flop, and through a 74LS14 Schmitt trigger 45, as a CLK input to the flip-flop. A reset switch 47 is connected between ground and a SET input to the flip-flop 43. A source of +5 volts potential is connected to a CLR input to the flip-flop 43, and through resistor R7, to the D input of the flip-flop 43 and to the Schmitt trigger 45. A Q output of the flip-flop 43 is connected by line 49 as one input to a 74LS08 AND gate 51. The other input to the AND gate 51 is the +5 potential through resistor R8 on line 53. Output 5 of the AND gate 51 is supplied as one input to a 74LS08 AND gate 57. The other input to AND gate 57 is a logic "0" on line 59, always ON. Output 61 of the AND gate 57 is supplied as one input to a 74LS32 OR gate 63. The other input to OR gate 63 is a logic "1" on line 65, always OFF. Output 67 of the OR gate 63 is supplied to a computer/peripheral driver/relay as an output logic "0" when a liquid to no liquid transition is sensed by the detector 10, within the timing limits set by the NE 555 timing circuit 39. The logic circuit 37 allows the output 67 to be controlled either manually or automatically by providing three output states: on/off/automatic. Other forms of logic circuits could be used in place of the logic circuit 37. For example, NAND gates could be substituted for the AND and OR gates used in the circuit 37.

The output circuit 33 employs a variable time delay and latching required of a fluid activated switch. Latching is important in such applications as chromatography to provide for absolute sequencing of sensor outputs. For less demanding uses, the latch may be omitted. The output of the circuit 33 is logic oriented to provide for remote, manual on, manual off or automatic operation purely for convenience. The remote input could be moved in front of the latch to provide for remote pulsed signals.

No single optical fluid detector 10 which has a fixed power light source, such as a constant current LED, can possibly sense a difference in absorption of any empty or filled tube 50 if the tubes are made of differing materials or of different sizes or are filled with differing fluids. For one set of constraints, namely optical absorption of fluid equal to that of water at 800–900 nanometers, a tube 50 outside diameter of one-eighth inch and fabricated from Tygon plastic material, the detector circuit of FIG. 3 produces a noise free TTL compatible output without a potentiometer, employing a fixed resistor at R2. Small variations in the manufacturing tolerances of the electrical components are accommodated by the large optical changes induced in the sensor. This implies that the optical housing 12 is mechanically perfect and does not vary sufficiently to change the optical path from one detector 10 to another. A potentiometer is needed to handle other sets of conditions and to allow field adjustments of the detector as aging of the IRLED D1 occurs, typically after years of use.

The problems of size, manufacturing cost and optical/mechanical alignment of the light source and sensor are solved by using a light source and a sensor, such as the LED 26 and the phototransistor 28 each having facing, flat surfaces 30 and 32. LEDs and sensors are commercially available with the sensor electronics already centered with respect to the LED. Furthermore, the facing, flat surfaces 30 and 32 allow easy machining or casting of the housing 12 to set the distance between the emitter-detector pair absolutely the same from one device to another. Flat surfaces on the housing mating with the flat surfaces on the emitter-detector pair are easily and inexpensively machined or cast to close tolerances, allowing the devices to be mechanically identical, thus allowing identical optics, which will allow consistent sensing.

Figure 4:
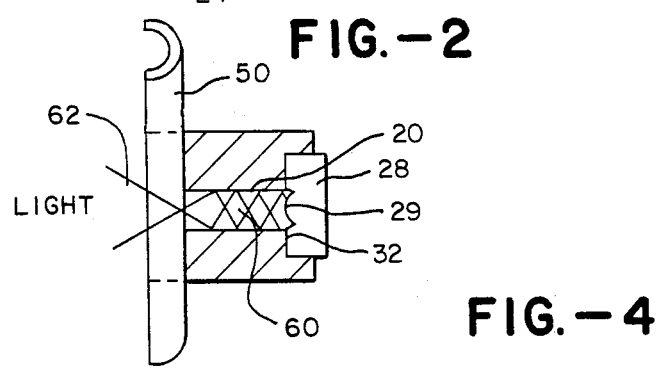
FIG. 4 is a partial perspective and partial cross-section view of a portion of the detector shown in FIGS. 1 and 2.

The configuration of the passage 20 in housing 2 produces collimation of the light passing from the LED 26 to the phototransistor 28 because the passage 20 is longer than its diameter. The collimation provided by this configuration increases the discrimination of the detector 10. This collimation effect can be understood as a way to allow the phototransistor 28 optically to see only the area of the tube that is actually changing when the liquid is present or absent from the tube 50. Referring to FIG. 4, it can be seen that stray light 60 from the tube 50 can be reflected along the passage 20 by bouncing around inside the tube. This stray light comes from outside sources or light from the LED 26 that is scattered or diffracted in the tube 50. Making the passage 20 at least as long or longer than its diameter attenuates the stray light 60. This means that the light reaching the phototransistor 28 is primarily direct light 62 from the LED 26. As a result, the optical change sensed by the phototransistor 28 between the presence and absence of liquid in the tube 50 is maximized, allowing the electronic sensing to be unambiguous.

The following considerations are important in the choice of the circuit 34 for the detector 10. One would like the real world to TTL step to be simple. A precision sensor—emitter pair, such as the H23B1 GE pair, allows the detector 10 to work without a potentiometer, given the physical set of constraints discussed above. With an inexpensive potentiometer, essentially any commercially available flat sensor—emitter pair will work without part sorting, while allowing for differing tubes and liquids, and allowing adjustment for aging of the IRLED D1 and plastic tubing 50. Less precise, rounded sensor—emitter pairs vary too much from part to part and in their positioning in an optical housing to give uniform reliable, stable readings without an additional potentiometer in place of resistor R3.

By following the above physical constraints to maximize the sensed optical change between the presence and absence of liquid, no potentiometer is also required for the R4–R5 voltage divider. A potentiometer for adjusting the voltage divider is required in prior art detectors not following the above physical constraints or using the mechanical design of this invention.

The detector circuit can be further simplified by using certain types of sensor—emitter pairs. Commercially available GE H23L1 or TRW OPL 550/0P 240 SL pairs have totem pole or open collector, Schmitt trigger outputs. The operational amplifier and photodiode are built into the sensor. This has two effects. The trigger provides a very fast, clean 0 or 1 output. Secondly, the hysteresis built into the electronics, combined with the physical housing as described above, acts to offset minor changes in ambient light or LED drive current, thus allowing the elimination of a constant current source for the LED, as required in the prior art.

The large change in light obtained between the presence and absence of liquid in the tube 50 also has a similar effect in the comparator circuit. Instead of sensing millivolt changes with the comparator, the housing gives a 1.5–2.5 volt change. With this sort of sensing gain, power source variations, noise and the like are insignificant.

The detector 10 detects the presence or absence of a liquid in the tube 50. The tube 50 may be clear or translucent, such as a Teflon tube. The detector 10 is for a clear fluid. The detector 10 could be modified to work with an opaque liquid, with change of the LED drive current and the logic of the device. With opaque liquids, more light is seen with the tube empty, and the logic of the device would be inverted, giving rise to an inversion of the output electronics. With a suitable detector circuit, the detector 10 could also be used to measure small changes in optical density of the liquid.

The phototransistor 28 sees more light with clear liquid in the tube because of the lensing effect of the tube curvature than without liquid in the tube. In contrast, prior art detectors are described as seeing more light without clear fluid. The detectors 10 work best with smaller tubes. As the tube diameter increases, less difference in the amount of light at the transistor between the presence and absence of the liquid will occur. In general, tube diameters between about 1/16th inch and about ¼ inch are operable.

Figure 5:
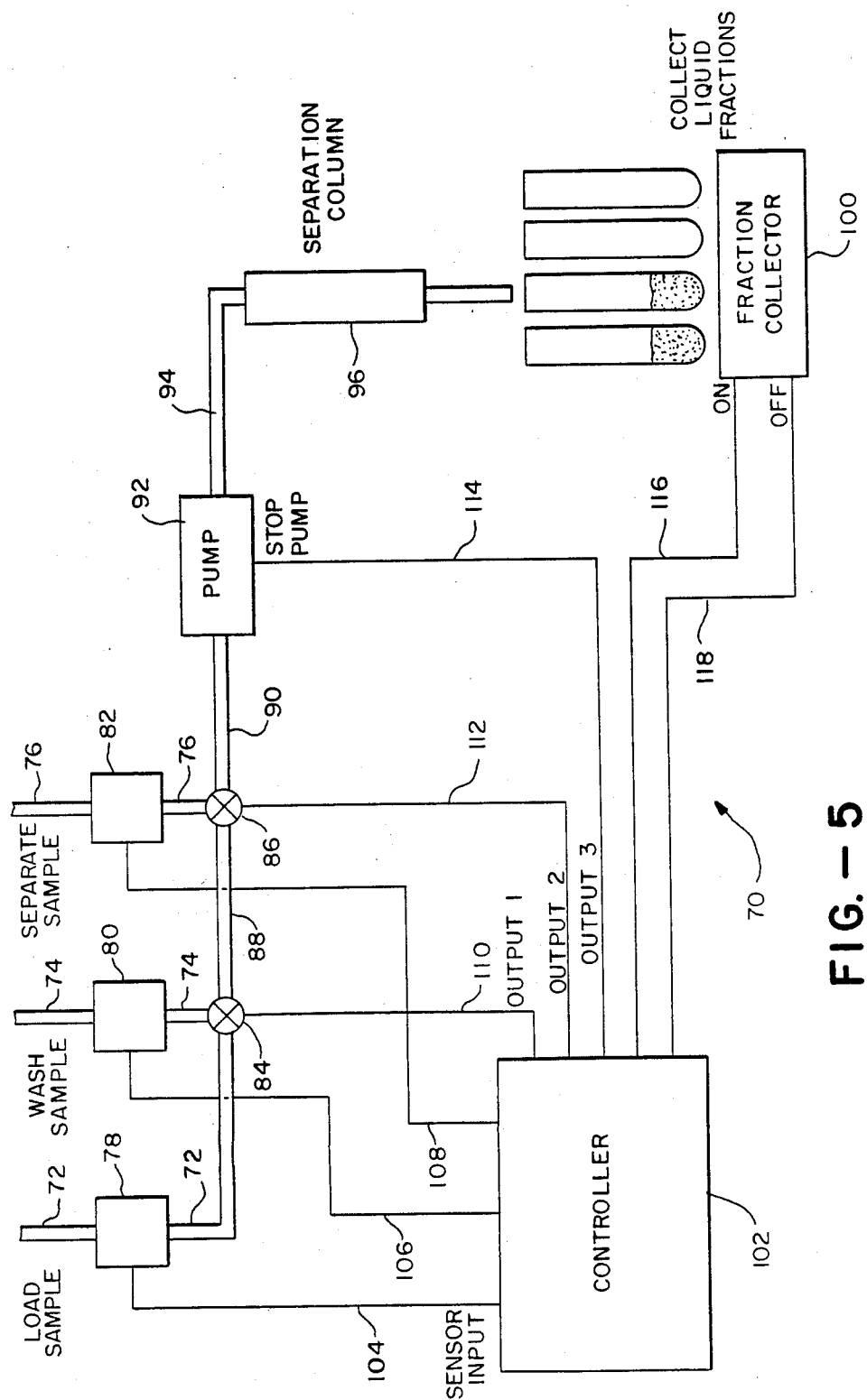
FIG. 5 is a block diagram of a typical chromatography controller in which the optical fluid detector and circuit of FIGS. 1-4 is used.

FIG. 5 shows a typical chromatography controller system 70 in which the optical fluid detector 10 and circuits 33 of FIGS. 1–4 are employed. Liquid conveying tubes 72, 74 and 76 are respectively connected between a liquid sample source, a sample washing liquid source, a sample separation liquid source and sensors 78, 80 and 82. The sensors 78–82 each incorporate the optical fluid detector 10 and circuits 33. Tubes 72 and 74 pass through the sensors 78 and 80 to a first controllable valve 84, and tube 76 passes through sensor 82 to a second controllable valve 86. Liquid conveying tubes 88 and 90 connect the valves 84 and 86 in series to a pump 92. The sensor 82 could also be placed between the valve 86 and the pump 92. The pump is in turn connected by tube 94 to a separation column 96. Output tube 98 of the separation column 96 is connected to supply separated liquid fractions to a sample fraction collector 100.

A system controller 102 is electrically connected to the sensors 78–82 by lines 104, 106 and 108 to receive output signals from the sensors 78–82 indicating the presence or absence of liquid in the tubes 72–76. Together, the system controller 102 and the sensors 78–82 comprise three sets of the output circuits 33, together with interface circuits for providing control signals to the elements of the system 70 connected to receive control signal outputs from the system controller 102. First control output line 110 connects the controller 102 to the valve 84. Controller 102 uses the transition from presence to absence of liquid in tube 72 as sensed by sensor 78 to switch valve 84 from tube 72 to tube 74 to initiate washing of a sample after it has been loaded. Second control output lines 112 and 116 are separately connected to the valve 86 and to the sample fraction collector 100. The controller 102 uses the transition from presence to absence of liquid in tube 74 as sensed by sensor 80 to initiate separation of a sample after it has been washed by switching valve 86 from tube 74 to tube 76. Controller 102 uses the same transition to turn on the sample fraction collector 100. Third control output lines 114 and 118 are separately connect the controller 102 to the pump 92 and the sample fraction collector 100. The controller 102 uses the transition from presence to absence of liquid in tube 76 to stop pump 92 and to turn off the fraction collector 100. The controller 102 also uses the control output lines 110-118 to control operation of the valves 84 and 86, pump 92 and the fraction collector 100 otherwise as appropriate during the operation of the chromatography controller system 70, based on inputs to the delay circuits 36 and the logic circuits 31, through interface circuits for valve power and the fraction collector.

Alternatively, the controller 102 could be implemented with a microprocessor to give increased functionality to the system 70, such as providing automatic purging, automatic control of sensor drive currents to eliminate manual adjustment, and alternate time based control of outputs. In this form of the controller 102, operation of the system 70 would be carried out with a stored program provided in the controller 102.

The output circuits 33 allow the controller 102 to operate valves 84 and 86, pump 92 and fraction collector 100 automatically. Alternatively, the output circuits 33 are configured to allow manual output from the controller 102 for operation of the system 70. The performance characteristics of the optical fluid detector 10 and the output circuits 33 allow them to meet the requirements of the chromatography controller system 70 by detecting the presence or absence of liquid in a highly reliable manner in a chromatography system environment without providing false indications of the absence of liquid as a result of air bubbles in the liquid.

It should now be readily apparent to those skilled in the art that a novel optical fluid detector capable of achieving the stated objects of the invention has been provided. The detector does not require the fabrication of any precision parts, and it uses a simple circuit allowing it to be provided in compact form. Different resistor values are not required for each circuit fabricated, and the detector can be used to detect the presence or absence of liquid in a transparent or translucent, flexible tube. The physical configuration of the housing maximizes the amount of change in the light seen by the phototransistor sensor, while at the same time allowing an inexpensive housing to be made. The detector is able to differentiate between a tube filled with clear liquid, an empty tube and a tube filled with an opaque liquid simply by changing the detector circuit. Direct TTL compatible output may be obtained, or a comparator may be used.

These advantages of the optical fluid detector make it particularly suited for monitoring critical fluid flow operations, such as in the delivery of solutions in chromatography apparatus and in monitoring intravenous solution delivery to patients. This optical fluid detector should find application in a wide variety of other uses as well, such as a sensor in robotically controlled laboratory apparatus and other automated machinery, general liquid handling applications, automotive applications, such as sensing windshield washer fluid presence, foam monitoring in fermentation to control end point, turbidity monitoring, sensing condensation build up in solar heaters, and the like.

It should further be apparent to those skilled in the art that various changes in form and details of the invention as shown and described may be made. It is intended that such changes be included within the spirit and scope of the claims appended hereto.

What is claimed is:

1. An optical fluid detector for determining the presence or absence of a liquid filling a tube, which comprises an opaque housing, a first passage through said housing dimensioned and configured to receive an at least semitransparent, flexible plastic tube which is filled with the liquid when the liquid is present, a second passage through said housing is present, a second passage through said housing orthogonally intersecting said first passage, a first receptacle in said housing at a first end of said second passage, a light emitting diode in said first receptacle having a flat surface facing said second passage and engaging a mating surface in said first receptacle, a second receptacle at a second end of said second passage on an opposing side of said first passage from said first receptacle, a photodetector in said second receptacle having a flat surface said second passage and having a flat surface facing said second passage and engaging a mating surface in said second receptacle, and an output circuit connected to said photodetector, said output circuit including means for establishing a time delay on a liquid to no liquid transition between said light emitting diode and said photodetector.

2. The optical fluid detector of claim 1 in which said photodetector comprises a phototransistor.

3. The optical fluid detector of claim 1 in which said output circuit comprises a detector circuit connected to said photodetector, said means for establishing a time delay in the form of a delay circuit connected to receive an output from said detector circuit, and a logic circuit connected to receive an output from said delay circuit.

4. The optical fluid detector of claim 3 in which said detector circuit comprises an operational amplifier having a first input terminal connected to receive an output signal from said photodetector and a second input terminal connected to a reference potential.

5. The optical fluid detector of claim 3 in which said logic circuit comprises a flip-flop circuit connected to receive the output from said time delay circuit, a first AND gate connected to receive an output from said flip-flop circuit, a second AND gate connected to receive an output from said first AND gate, and an OR gate connected to receive an output from said second AND gate.

6. The optical fluid detector of claim 1 in which said second passage has a first portion between the flat surface of the housing of said light emitting diode and said first passage and a second portion between the flat surface of the housing of said photodetector and said first passage, said first and second portions having a length greater than a cross section dimension of said second passage.

7. The optical fluid detector of claim 1 connected to a chromatography system, said optical fluid detector being electrically connected to provide signal inputs to a controller of said chromatography system, said controller being electrically connected and configured to control operation of said chromatography system based on the signal inputs.

8. The optical fluid detector and chromatography system of claim 7 additionally comprising at least one additional optical fluid detector connected to said chromatography system.

* * * * *